United States Patent [19]

Suciu

[11] Patent Number: 4,687,346

[45] Date of Patent: Aug. 18, 1987

[54] LOW PROFILE BEARING SUPPORT STRUCTURE

[75] Inventor: Gabriel L. Suciu, Glastonbury, Conn.

[73] Assignee: United Technologies Corporation, Hartford, Conn.

[21] Appl. No.: 902,986

[22] Filed: Sep. 2, 1986

[51] Int. Cl.[4] .................. F16C 27/00; F16C 33/72; F16J 15/34; F01D 25/16

[52] U.S. Cl. ......................... 384/99; 277/85; 384/483; 384/535; 415/113

[58] Field of Search .............. 384/99, 477, 142, 420, 384/535, 581, 483; 277/85, 87, 93 SD, 81 R, 136, 137; 415/170 R, 173 R, 174, 110–113

[56] References Cited

U.S. PATENT DOCUMENTS

| | | | |
|---|---|---|---|
| 2,460,746 | 2/1949 | Guthrie | 277/87 |
| 2,843,404 | 7/1958 | Janetz | 277/85 |
| 3,572,727 | 3/1971 | Greiner | 277/85 X |
| 4,214,796 | 7/1980 | Monzel et al. | 415/113 X |
| 4,429,923 | 2/1984 | White et al. | |
| 4,453,783 | 6/1984 | Davis et al. | |
| 4,457,667 | 7/1984 | Seibert et al. | 384/99 X |
| 4,477,088 | 10/1984 | Picard | 277/88 X |
| 4,578,018 | 3/1986 | Pope | 384/420 X |

Primary Examiner—Stuart S. Levy
Assistant Examiner—Thomas R. Hannon
Attorney, Agent, or Firm—Troxell K. Snyder

[57] ABSTRACT

A bearing support in which a rotating shaft (2) is disposed within a fixed support structure (14) and includes a bearing assembly (4) centered within the fixed support structure (14) by a plurality of resilient centering rods (20). A seal carrier (28) is urged against a rotating sealing surface (26) by a spring (32) and is radially positioned by a plurality of guide pins (34) secured to the fixed support structure (14). The guide pins (34) are disposed circumferentially intermediate the centering rods (20) to achieve a low profile configuration.

6 Claims, 4 Drawing Figures

LOW PROFILE BEARING SUPPORT STRUCTURE

FIELD OF THE INVENTION

The present invention relates to a bearing structure for supporting a rotating shaft within a fixed support structure.

BACKGROUND

Bearing supports having an annular oil damper for absorbing periodic radial movement have long been used in high speed rotating shaft applications, such as in the main bearings of a modern gas turbine engine. The annular oil damper is typically combined with a resilient mechanical centering means such as a plurality of centering rods, for supporting and positioning the bearing within the annular oil damper.

Examples of such structures are well disclosed in U.S. Pat. No. 4,429,923 issued Feb. 7, 1984 to White et al and U.S. Pat. No. 4,453,783 issued June 12, 1984 to Davis et al. The Davis and White patents show two configurations for resiliently supporting the outer bearing race within an annular oil film damper for providing the proper support to a high speed rotating shaft which is at least occasionally subject to a rotary imbalance or other radial displacement producing influences.

Another feature, disclosed in the drawings of the Davis and White references and necessary in turbomachine applications, is a shaft seal for preventing blowby of the working fluid through the bearing compartment. This sealing function is accomplished by the cooperation of a radially extending sealing surface disposed about the shaft and rotatable therewith and a non-rotating sealing ring axially adjacent the sealing surface and urged axially thereagainst for forming the desired seal.

The prior art bearing support arrangements function well in damping, supporting, and sealing the bearing structure. Modern gas turbine engine designers, however, in an effort to further increase engine efficiency and reliability, have sought to reduce the radial height of the bearing support structure in order to minimize the radius of the engine intermediate case which forms the radially inner flow barrier for the engine axial compressor section. Such a low profile bearing support structure would reduce the ratio of the hub and blade tip radii, thus both reducing engine outer diameter for a given gas flow area and increasing core engine angular velocity for a given blade tip circumferential speed.

What is needed is a bearing support structure which provides the necessary supporting, damping, and sealing functions in a low radial profile configuration.

DISCLOSURE OF THE INVENTION

It is therefore an object of the present invention to provide a bearing support structure for a rotating shaft in a gas turbine engine or the like.

It is further an object of the present invention to provide a bearing support having a reduced radial height as compared to prior art supports.

According to the present invention, a reduced height bearing arrangement is provided by at least spatially integrating the centering rods for resiliently radially supporting the outer bearing race and the seal guide pins for supporting the shaft seal ring. In the preferred embodiment, at least three guide pins for the seal rings are disposed circumferentially intermediate a plurality of axially extending centering rods. The centering rods are each secured between an outer supporting ring disposed about the bearing outer race and a fixed support structure such as a gas turbine engine intermediate case.

By radially overlapping the guide pin and centering rod circles, the bearing support of the present invention reduces the radial displacement of the bearing arrangement as compared to the prior art. The reduced bearing profile results in a beneficial reduction in engine hub to tip radius ratio, reduced blade tip speed at a given engine rotor angular velocity, and reduced engine outer diameter for a given gas flow area.

An alternative embodiment of the bearing arrangement according to the present invention integrates the structure of the centering rods and seal guide pins. The seal ring slidably engages at least three of the centering rods and is urged axially into sealing engagement with a corresponding, radially extending seal surface disposed about the shaft and rotatable therewith.

Both these and other objects and advantages of the bearing support according to the present invention will be apparent to those skilled in the art upon review of the following specification and the appended claims and drawing figures.

BEST MODE FOR CARRYING OUT THE INVENTION

Figure 1:
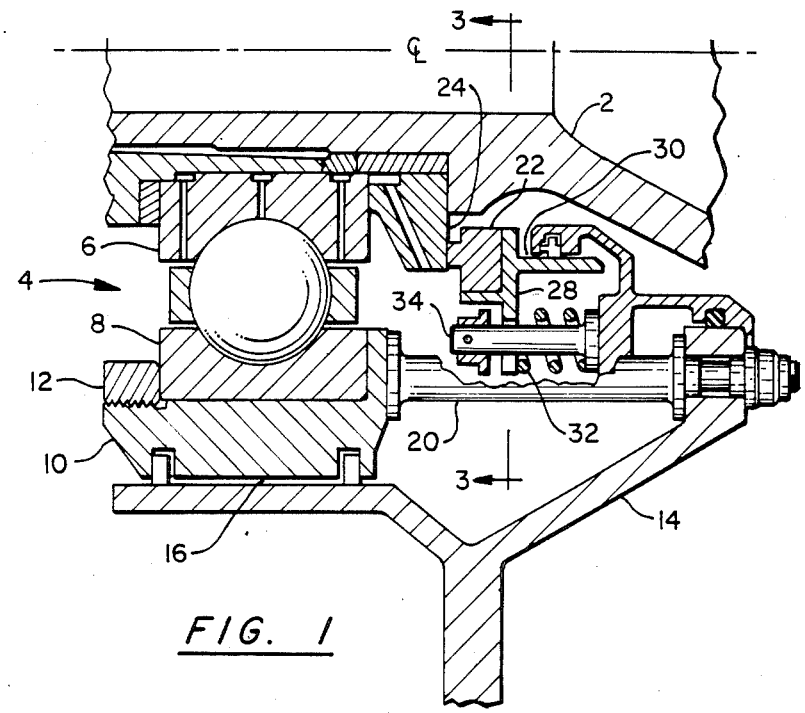
FIG. 1 is a sectional side view of the preferred embodiment of the bearing support according to the present invention.

FIG. 1 shows the preferred embodiment bearing configuration and support according to the present invention. A rotating shaft 2 turns within an annular bearing assembly 4 having a rotating inner race 6 and a non-rotating outer race 8. The outer race 8 is received within a supporting ring 10 and secured by a gland nut 12 or other securing means.

The shaft 2, bearing assembly 4, and supporting ring 10 are disposed within a fixed support structure 14, such as the intermediate case of a gas turbine engine or the like. An annular damper 16 is defined between the supporting ring 10 and the fixed support structure 14 for absorbing any radial movement of the shaft 2 and bearing 4 as is well known in the art.

The supporting ring 10, and hence the bearing assembly 4 and shaft 2, are resiliently supported within the fixed support structure 14 by a plurality of axially extending support rods 20 secured between the supporting ring 10 and the fixed support structure 14.

Sealing between the rotating shaft 2 and the support structure 14 is provided by an annular, non-rotating seal ring 28 which is urged axially against a radially extending sealing surface 24 rotating with the shaft 2. The seal ring 28 engages an axial sliding seal 30 for accommodating any axial movement between the sealing surface 24 and the fixed support structure 14. The seal ring 28 and integral annular seal member 22 are urged axially against the sealing surface 24 by a spring 32 compressed between the fixed support structure 14 and seal ring 28.

The seal ring 28 is radially positioned about the shaft 2 by cooperative engagement with at least three guide pins 34. In the preferred embodiment of the present invention the guide pins 34 are distinct from the centering rods 20 and disposed circumferentially therebetween. As can be seen in FIG. 1 wherein the centering rod 20 has been cut away to display the circumferentially adjacent guide pin 34, the radial band defined by the circle of centering rods 20 overlaps the radial band defined by the circle of guide pins 34.

Figure 3:
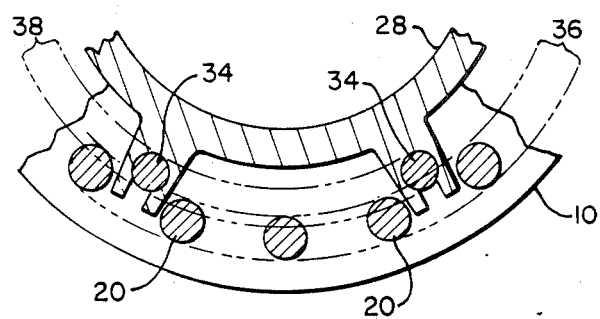
FIGS. 3 and 4 are partial axial sectional views of the preferred and alternative embodiments, respectively.

FIG. 3 more clearly shows this overlapping relationship between the centering rod circle 36 and the guide pin circle 38. It should be noted that although geometric considerations dictate a minimum requirement of three centering rods for maintaining the supporting ring 10 centered within the fixed support structure 14, practical design considerations have resulted in a typical gas turbine engine using 20 or more centering rods evenly distributed about the shaft 2. Likewise, it has been found preferable to use four guide pins 34 instead of the geometric minimum requirement of three in order to provide a backup in case one pin should fail or become damaged.

By overlapping the centering rod circle 34 and guide-pin circle 38, the present invention reduces the radial profile of the overall bearing configuration which includes the bearing assembly 4, supporting ring 10, oil damper 16, centering rods 20, and the sealing ring 22 and associated structure. The above discussed prior art bearing structures, by locating the centering rods and guide pins in radially spaced apart circles, are unable to achieve the low overall configuration of the bearing support according to the present invention.

Figure 2:
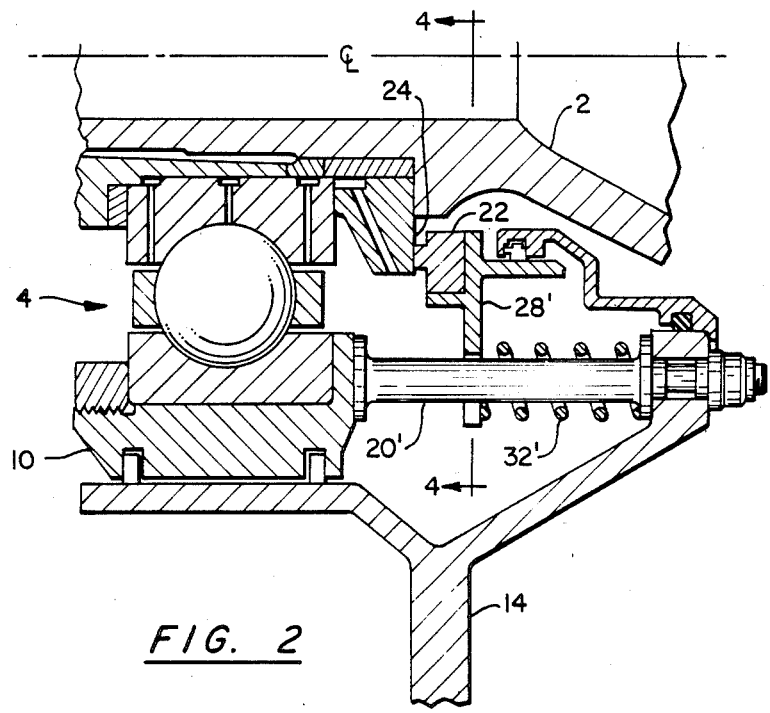
FIG. 2 is a sectional side view of an alternative embodiment of the bearing support according to the present invention.

FIG. 2 shows an alternative embodiment of the bearing support according to the present invention wherein the guide pins 34 and the centering rods 20 are both physically and functionally integrated into a combined structure 20'. In the alternative embodiment, the seal ring 28' is slidably engaged with the integrated guide pin-centering rod 20' for providing the desired radial support. A compressed spring 32' provides the necessary axially directed urging force against the seal ring 28' for establishing sealing engagement with the corresponding sealing surface 24.

Figure 4:
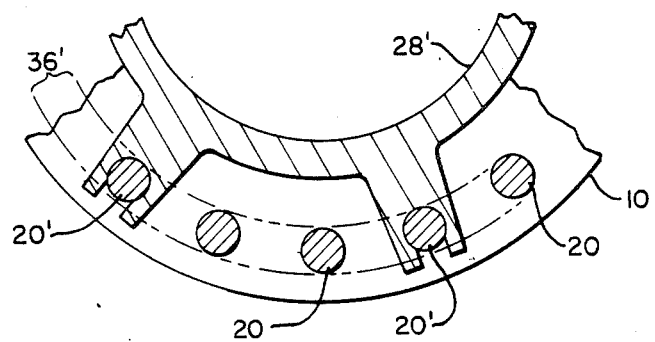

FIG. 4 shows an axial cross section of the seal ring 28' and integrated guide pin-centering rods 20' of the alternative embodiment. The circles defined by those integrated rods 20' which support the seal carrier 28' and those rods 20 which only function to support the sealing ring 10 are identical and defined by the reference numeral 36'. The integrated structure of the alternative embodiment provides a simpler, but effective, arrangement for both resiliently supporting the supporting ring 10 and providing the required radial support and axial urging force to the seal ring 22.

In both the preferred and alternative embodiments it is preferable that the centering rods 20, 20' and guide pins 34 be distributed regularly about the shaft 2 in order to provide balanced and uniform support to the corresponding structures. It will further be appreciated that such regular distribution of such members results in an integral ratio of the number of centering rods to the number of guide pins (or functional equivalent thereof). Thus, in the preferred embodiment as shown in FIG. 3, an arrangement having, for example, twenty evenly distributed centering rods 20 could accommodate, four, five, ten, or twenty evenly distributed guide pins 34 intermediate the centering rods 20. For the alternative embodiment as shown in FIG. 4, again in a configuration having a total of twenty centering rods 20, 20', four, five, ten or twenty of such rods would serve as integrated guide pin-centering rods 20' for supporting the seal carrier 28'.

The present invention has thus been disclosed illustratively in both preferred and alternative embodiments, which, along with other embodiments and arrangements that will become apparent to those skilled in the art without departing from the scope of the present invention, are well suited to achieve the objects and advantages as set forth hereinabove.

I claim:
1. A bearing support having
    a fixed support structure,
    a rotating shaft positioned within the fixed support structure,
    a bearing for the shaft having a non-rotating outer race,
    a supporting ring for receiving the outer race,
    an oil damping structure radially interposed between the supporting ring and the fixed supporting structure,
    a radially extending sealing surface, disposed about the shaft and rotating therewith,
    a seal ring disposed axially adjacent the annular sealing surface,
    means for radially positioning the seal ring relative to the sealing surface, and
    means for resiliently positioning the supporting ring relative to the fixed support structure,
    characterized in that:
    the seal ring positioning means defines a corresponding radial displacement band;
    the supporting ring positioning means defines a corresponding radial displacement band; and
    the seal radial band overlaps the supporting ring radial band.

2. The bearing support as recited in claim 1, wherein
    the supporting ring positioning means includes a plurality of centering rods evenly distributed about the shaft and extending axially between the supporting ring and the fixed support structure; and
    wherein the seal ring positioning means includes a plurality of axially extending guide pins, disposed circumferentially intermediate the centering rods and extending axially from the fixed supporting structure into sliding engagement with the seal ring.

3. The bearing support as recited in claim 2, wherein
    the number of centering rods is greater than the number of guide pins, and wherein
    the numerical ratio of centering rods to guide pins is an integer.

4. The bearing support as recited in claim 1, further characterized in that
    the supporting ring positioning means and the seal ring positioning means are integrated and comprise a plurality of integrated guide pin-centering rods, each integrated rod extending axially between the fixed support structure and the supporting ring, and each integrated rod being slidably engaged with the seal ring.

5. The bearing support as recited in claim 1, further characterized in that
    the supporting ring positioning means includes at least three centering rods extending axially between the supporting ring and the fixed support structure, and
    at least three of the centering rods are slidably engaged with a portion of the seal ring for providing radial support thereto.

6. The bearing support as recited in claim 5, further including
    means for axially urging the seal ring against the rotating sealing surface.

* * * * *